March 17, 1964 D. R. VON RECKLINGHAUSEN 3,125,641

APPARATUS FOR INDICATING STEREOPHONIC BROADCASTING TRANSMISSION AND THE LIKE

Filed June 25, 1962

INVENTOR

DANIEL R. vonRECKLINGHAUSEN

BY Rines and Rines

ATTORNEYS

United States Patent Office 3,125,641
Patented Mar. 17, 1964

3,125,641

APPARATUS FOR INDICATING STEREOPHONIC BROADCASTING TRANSMISSION AND THE LIKE

Daniel R. von Recklinghausen, Arlington, Mass., assignor to H. H. Scott, Inc., Maynard, Mass., a corporation of Massachusetts Filed June 25, 1962, Ser. No. 205,038
7 Claims. (Cl. 179—15)

Figure 1:
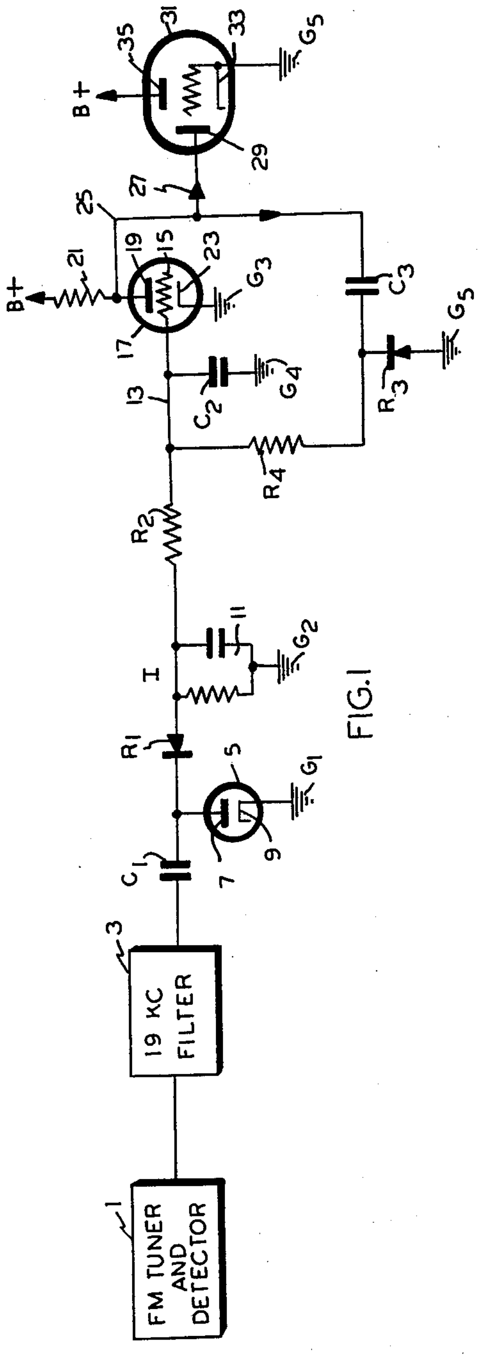

The present invention relates to apparatus for indicating the broadcasting of particular types of radio transmissions and, more particularly, to indicating that stereophonic broadcasting transmissions are in the process of being transmitted.

While the techniques of the present invention, as will later be made more evident, are suited for more general applications, as well, the invention is particularly adapted for utilization in indicating that certain frequency-modulation transmission stations are transmitting stereophonic broadcasting signals. Normally, frequency-modulation stations will transmit a main channel audio-frequency-modulated signal of a carrier of the order of say 100 megacycles. When not simultaneously broadcasting stereophonic signals, the station may also transmit background music in conventional multiplex fashion. When the stereophonic broadcast signals are to be transmitted, however, in addition to the main-channel audio-signal, frequency-modulated upon the FM carrier, a 38-kilocycle amplitude-modulated sub-channel carrier is transmitted, containing a second audio signal, which, with the main-channel audio signal constitutes a pair of stereo signals. In addition, a 19-kilocycle pure-tone pilot signal will be frequency-modulated and transmitted simultaneously for the purpose of enabling generation of a 38-kilocycle re-insert carrier at the receiver, as by doubling circuits or synchronization with an oscillator of that frequency, in order to enable the separation of the stereophonic transmission, as described, for example in my article entitled "Stereophonic FM Receivers and Adapters," appearing in the November, 1961 issue of the Institute of Radio Engineers Transactions on Broadcast and Television Receivers, volume BTR-7, No. 3, pages 66 through 71.

At the receiving station the 19-kilocycle pilot tone is extracted with a relatively narrow filter associated with a demodulation circuit. If the receiver tuner gain is relatively low, the output of the filtered 19-kilocycle pilot frequency may be rectified and directly used as an indication that the station is broadcasting stereophonic signals. If, however, the tuner gain is high, even in the absence of the station signal, the signal output of the filter due to noise alone is of the same order of magnitude or greater than the magnitude of the 19-kilocycle signal. This is because when the station is broadcasing stereophonic signals, the deviation of the carrier due to this 19-kilocycle pilot tone is only 8 to 10% of the maximum modulation, which is the order of 75 kilocycles. Such a rectifying-indicating circuit would therefore give a wrong indication that stereophonic broadcasting was actually being transmitted, whereas such was not the case.

An object of the present invention, accordingly, is to provide a fool-proof apparatus for indicating that stereophonic broadcast signals are being transmitted, and that shall not be subject to the above-mentioned disadvantages.

A further object is to provide a new and improved radio-transmission indicator circuit of more general utility, as well.

In summary, from one of its more specific viewpoints, the invention relates to indicating transmissions of a frequency-modulated carrier containing a pilot frequency modulation with apparatus having, in combination, a tuner for receiving and detecting the carrier, and a filter tuned to the pilot frequency and connected to the tuner for extracting the pilot frequency from the detected carrier; the filter producing noise in its output as an amplitude-modulation of the pilot frequency during the reception of the same, and the noise alone in the absence of reception of the pilot frequency. First rectifying means is connected with the filter for producing a direct-current component of the output thereof, and further rectifying means is connected with the filter for detecting the negative modulation peak components of the said amplitude modulation of the pilot frequency during the reception of the same. A mixing circuit is provided for substracting the said direct-current and negative modulation peak components, and indicating means is connected with the mixing circuit to provide for the production of a direct-current output substantially proportional to the said negative modulation peak components.

Figure 2:
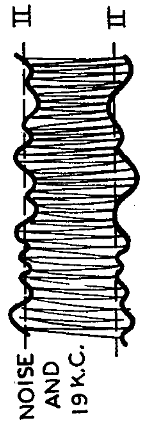
Figure 3:
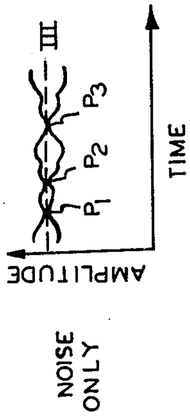

The invention will now be described in connection with the accompanying drawing FIG. 1 of which is a schematic circuit diagram illustrating the invention in preferred form; and FIGS. 2 and 3 are wave-form diagrams illustrating, respectively, the reception of the 19-kilocycle pilot frequency and the inherent noise modulation, and the reception of noise alone in the absence of the 19-kilocycle frequency.

Referring to the drawing, the frequency-modulation tuner and detector is shown at 1 receiving the before-described radio-frequency transmissions. The 19-kilocycle filter is shown at 3 for the purpose of extracting the 19-kilocycle or other pure-tone pilot signal that, as before stated, accompanies the broadcast of stereophonic signals and other types of transmissions, also.

In accordance with the invention, the filtered 19-kilocycle pilot frequency is fed to a peak-to-peak rectifier system through a capacitor $C_1$. The rectifier system comprises a first shunt diode, shown as of the vacuum-tube type 5, provided with an anode 7 and a cathode 9 connected to a ground terminal $G_1$, and a series-connected rectifier $R_1$, as of the solid-state type, if desired, to provide at the region I, a negative direct-current output component of the signal output from the 19-kilocycle filter 3. A resistance-capacitance network 11 is shunt-connected from the region I to ground $G_2$, with the time constant thereof adjusted such that the amplitude modulation in the output of the filter 3, due to the noise inherent in the bandwidth of the filter 3 itself, is unaffected by the presence of the network; but that other undesired frequency-components are by-passed to ground at $G_2$.

The direct-current rectified signal at I is fed to a first series-connected mixing resistor $R_2$ and also by way of conductor 13 to the input control electrode 15 of an amplifier 17, shown of the vacuum-tube type, having its anode 19 connected through a plate resistor 21 to a positive plate potential source B+, and its cathode 23 connected to the ground terminal $G_3$.

The term "ground," as used herein is intended to denote not only actual earthing but also chassis or other reference potential. All of the ground terminals above-mentioned and hereinafter described, moreover, will, of course, be commonly connected.

The amplifier 17 has its input circuit provided with a shunt capacitor $C_2$ to the ground terminal $G_4$ for the purpose of by-passing fluctuations of frequency outside the range of interest. From the output anode or plate 19 of the amplifier 17, an output signal, that is phase reversed from the input signal, is fed along conductor 25, through a coupling capacitor $C_3$, to a further shunt-connected rectifier $R_3$, shown as of the solid-state type, though other types may also be employed. The rectifier $R_3$, in turn, is connected to the ground terminal $G_5$. From the further rectifier $R_3$ the conductor 25 continues through a further mixing resistor $R_4$ that, in turn, connects with the junction between conductor 13 and the first mixing resistor $R_2$.

The further rectifier $R_3$ will thus receive the phase-inverted output of the amplifier 17 and thus detects the inverted negative peak modulation contained in any amplitude modulation in the output of the 19-kilocycle filter 3, producing a negative-modulation peak rectified component at the mixing resistor $R_4$. Since the original negative direct-current component output is available at the resistor $R_2$, as before explained, there will be a mixing of the two components and the control grid 15 of the amplifier 17 will receive the difference between the direct-current component of the output of the filter 3 and the detected or rectified negative modulation peak components of the amplitude modulation of the pilot frequency in the output of the filter 3. This difference voltage is also fed from the output conductor 25, by way of a conductor 27, to one of the anodes 29 of a magic-eye indicator 31, the control grid and cathode of which are shown at 33 connected to a ground terminal $G_5$, and the other anode 35 of which is shown connected to the B+ terminal, before described. Clearly, other types of indicating or detecting devices may be connected with the mixing circuit to thus produce a direct-current output voltage that is substantially proportional to the negative modulation peak components before discussed.

By this type of circuit, if there is no 19-kilocycle transmission, as when the stereophonic broadcasting signal is not being transmitted, there will be no output applied to the indicator 31. There can, moreover, be no spurious output, as before-explained in connection with just pure rectification systems. Even if noise is present in substantial quantity, there will be no output, since as shown in FIG. 3, the zero crossings $P_1$, $P_2$, $P_3$ of the noise will produce no output. The circuit of FIG. 1 is adjusted, furthermore, to indicate the smallest possible amount of pure 19-kilocycle frequency, as shown by the dash-lines II of FIG. 2 and the zero-crossing dash lines III of FIG. 3.

A further advantage of the circuit of the present invention, in addition to its fool-proof character with regard to indicating the transmission of a stereophonic broadcast signal, resides in the fact that should there be distortion products due to station modulation in the vicinity of 19 kilocycles, or inter-modulation products therewith, the indicator 31 will react to such output and give a smaller indication of the 19-kc. output. Thus, the indicator may be used as a fine-tuning device or where minimum fluctuations are obtainable, serving a function additional to indicating the actual presence of stereophonic broadcast transmissions.

Further modifications will occur to those skilled in the art and all such are considered to fall within the spirit and scope of the invention as defined in the appended claims.

What is claimed is:

1. Apparatus for indicating the transmission of a frequency modulated carrier containing a pilot-frequency modulation, said apparatus having, in combination, a tuner for receiving and detecting the carrier, a filter tuned to the pilot frequency and connected to the tuner for extracting the pilot frequency from the detected carrier, the filter producing noise in its output as an amplitude modulation of the pilot frequency during the reception of the same and as a noise signal alone in the absence of reception of the pilot frequency, first rectifying means connected with the filter for producing a direct-current component of the output thereof, further rectifying means connected with the filter for detecting the negative modulation peak components of the said amplitude modulation of the pilot frequency during the reception of the same, a mixing circuit for subtracting the said direct-current and negative modultion peak components, and indicating means connected with the mixing circuit for producing a direct current output substantially proportioned to the said negative modulation peak components.

2. Apparatus as claimed in claim 1 and in which the said pilot-frequency modulation is a 19 kilocycle frequency of a stereophonic broadcast transmission and the said filter is a 19 kilocycle filter.

3. Apparatus as claimed in claim 1 and in which the negative modulation peak component detecting means comprises an amplifier the input of which is connected to the first rectifying means for inverting the said direct-current component, and the output of which is connected to feed both the said indicating means and a further rectifier.

4. Apparatus as claimed in claim 3 and in which the mixing circuit comprises a first resistor connected between the first rectifying means and the said input of the amplifier and a second resistor connected between the said further rectifier and the said input of the amplifier.

5. Apparatus as claimed in claim 4 and in which the first rectifying means comprises a peak-to-peak rectifier shunt-connected to ground and a series-connected rectifier, and the said further rectifier is a rectifier shunt-connected to ground.

6. Apparatus as claimed in claim 4 and in which a network is connected to ground from a point of the output of the first rectifying means disposed between the said series-connected rectifier and the said first mixing resistor, with the time constant of the said network adjusted to a value such that it is ineffective upon the said amplitude modulation of the filtered pilot frequency.

7. Apparatus as claimed in claim 1 in which the said rectifying means are adjusted to detect substantially the smallest level of pilot frequency and the zero-amplitude crossings of the noise alone.

No references cited.